(12) United States Patent
Rock et al.

(10) Patent No.: US 8,028,674 B2
(45) Date of Patent: Oct. 4, 2011

(54) FUEL PROCESSOR APPARATUS AND METHOD

(75) Inventors: Kelly P. Rock, Henderson, NV (US); Bruce E. Nadeau, Jr., Las Vegas, NV (US)

(73) Assignee: LyteSyde, LLC, Miami Beach, FL (US)

( * ) Notice: Subject to any disclaimer, the term of this patent is extended or adjusted under 35 U.S.C. 154(b) by 1092 days.

(21) Appl. No.: 11/835,246

(22) Filed: Aug. 7, 2007

(65) Prior Publication Data

US 2009/0038582 A1    Feb. 12, 2009

(51) Int. Cl.
*F02M 61/04*    (2006.01)
*F02B 19/08*    (2006.01)

(52) U.S. Cl. .......... 123/255; 123/445; 261/76; 261/79.1
(58) Field of Classification Search ................... 123/250, 123/251, 255–258, 263, 275, 280, 533, 298–305, 123/590, 592, 594; 261/76, 79.1
See application file for complete search history.

(56) References Cited

U.S. PATENT DOCUMENTS

| | | |
|---|---|---|
| 634,242 A | 10/1899 | Lambert |
| 751,292 A | 2/1904 | Johanson |
| 860,259 A | 7/1907 | Smith |
| 1,163,437 A | 12/1915 | Morison |
| 1,233,557 A | 7/1917 | Curtis |
| 1,309,719 A | 7/1919 | Curtis |
| 1,313,521 A | 8/1919 | Connor et al. |
| 1,451,063 A | 4/1923 | Anthony |
| 1,471,220 A | 10/1923 | Tangye |
| 1,626,085 A | 4/1927 | Henriot |
| 2,071,717 A | 2/1937 | Winkle |
| 2,242,274 A * | 5/1941 | Thysse ............ 123/261 |
| 2,413,420 A | 12/1946 | Stephanoff |
| 2,599,422 A | 6/1952 | Yettaw |
| 3,279,179 A * | 10/1966 | Kemenczky ............ 60/221 |
| 3,286,997 A | 11/1966 | Ledbetter |
| 3,336,017 A | 8/1967 | Kopa |
| 3,395,899 A | 8/1968 | Kopa |
| 3,414,242 A | 12/1968 | Bouteleux |
| 3,506,589 A | 4/1970 | Hoffman et al. |
| 3,512,359 A | 5/1970 | Pierce |
| 3,515,676 A | 6/1970 | Hierta et al. |

(Continued)

FOREIGN PATENT DOCUMENTS

DE    1108666    6/1961

(Continued)

*Primary Examiner* — Willis Wolfe, Jr.
*Assistant Examiner* — Johnny Hoang
(74) *Attorney, Agent, or Firm* — Holland & Hart

(57) ABSTRACT

There is disclosed a fuel nozzle, a pre-combustion fuel mixing device, and methods related to fuel processing. In an embodiment, a fuel nozzle includes at least one port for receiving fuel, a sidewall forming ports for introducing fuel into a pre-combustion chamber, and a plurality of conduits formed between the first end and the sidewall. In one embodiment, a method includes creating a gaseous, homogenous premixture of fuel and oxidizer in a first pre-combustion vortex chamber, which includes introducing fuel at an axis of the oxidizer vortex both axially and radially through an injector having a plurality of ports through a sidewall arranged in a plurality of rows substantially parallel to one another. In an embodiment, an apparatus includes a pre-combustion fuel mixing device having a housing with a first pre-combustion vortex chamber having a first compartment, a second compartment, and a third compartment.

16 Claims, 13 Drawing Sheets

U.S. PATENT DOCUMENTS

| | | | |
|---|---|---|---|
| 3,651,619 | A | 3/1972 | Miura |
| 3,667,221 | A | 6/1972 | Taylor |
| 3,733,060 | A | 5/1973 | Merritt |
| 3,761,065 | A | 9/1973 | Rich et al. |
| 3,778,038 | A | 12/1973 | Eversole |
| 3,811,278 | A | 5/1974 | Taylor et al. |
| 3,866,585 | A | 2/1975 | Kopa |
| 3,944,634 | A | 3/1976 | Gerlach |
| 3,946,552 | A | 3/1976 | Weinstein et al. |
| 3,972,182 | A | 8/1976 | Salvi |
| 4,030,283 | A | 6/1977 | Sauthier et al. |
| 4,062,663 | A | 12/1977 | Spevack |
| 4,087,862 | A | 5/1978 | Tsien |
| 4,159,881 | A | 7/1979 | Gogneau |
| 4,173,863 | A | 11/1979 | Motoki et al. |
| 4,178,134 | A | 12/1979 | Babish et al. |
| 4,182,280 | A * | 1/1980 | Shekleton ............. 123/309 |
| 4,185,453 | A | 1/1980 | Jaunin |
| 4,215,535 | A | 8/1980 | Lewis |
| 4,217,313 | A | 8/1980 | Dmitrievsky et al. |
| 4,232,384 | A | 11/1980 | Jaunin |
| 4,245,338 | A | 1/1981 | Sekiya et al. |
| 4,255,410 | A | 3/1981 | Spevack |
| 4,261,048 | A | 4/1981 | Motoki et al. |
| 4,261,354 | A | 4/1981 | Nelson |
| 4,267,131 | A | 5/1981 | Prudhon et al. |
| 4,275,463 | A | 6/1981 | Ishida |
| 4,308,607 | A | 12/1981 | Kopa |
| 4,320,092 | A | 3/1982 | Kondo et al. |
| 4,335,804 | A | 6/1982 | Bardin et al. |
| 4,358,289 | A * | 11/1982 | Austin ............. 23/314 |
| 4,421,079 | A * | 12/1983 | Wade ............. 123/255 |
| 4,452,239 | A | 6/1984 | Malem |
| 4,464,314 | A | 8/1984 | Suroviken et al. |
| 4,515,734 | A | 5/1985 | Rock et al. |
| 4,568,500 | A | 2/1986 | Rock et al. |
| 4,635,857 | A | 1/1987 | Hughes |
| 4,726,686 | A | 2/1988 | Wolf et al. |
| 4,842,777 | A | 6/1989 | Lamort |
| 4,943,704 | A | 7/1990 | Rabenau et al. |
| 4,992,206 | A | 2/1991 | Waldron |
| 5,008,048 | A | 4/1991 | Ryder |
| 5,071,068 | A | 12/1991 | Suniewski |
| 5,169,302 | A | 12/1992 | Keller |
| 5,340,306 | A | 8/1994 | Keller et al. |
| 5,472,645 | A | 12/1995 | Rock et al. |
| 5,476,093 | A | 12/1995 | Lankinen |
| 5,487,378 | A | 1/1996 | Robertson et al. |
| 5,512,216 | A | 4/1996 | Rock et al. |
| 5,529,059 | A | 6/1996 | Armstrong et al. |
| 5,672,187 | A | 9/1997 | Rock et al. |
| 5,687,710 | A | 11/1997 | Ambrosio et al. |
| 5,775,320 | A | 7/1998 | Patton et al. |
| 5,848,750 | A | 12/1998 | Schwab |
| 6,113,078 | A | 9/2000 | Rock |
| 6,151,899 | A | 11/2000 | Park |
| 6,234,459 | B1 | 5/2001 | Rock |
| 6,244,573 | B1 | 6/2001 | Rock |
| 6,347,789 | B1 | 2/2002 | Rock |
| 6,536,748 | B1 | 3/2003 | Tachihara et al. |
| 2003/0155666 | A1 | 8/2003 | Amou et al. |
| 2004/0021235 | A1 | 2/2004 | Corr et al. |
| 2004/061001 | A1 | 4/2004 | Mao et al. |
| 2005/0035219 | A1 | 2/2005 | Rock |
| 2007/0169760 | A1 | 7/2007 | Rock |

FOREIGN PATENT DOCUMENTS

| | | |
|---|---|---|
| DE | 35 11 094 A1 | 10/1986 |
| DE | 94 02 811.7 | 7/1994 |
| DE | 44 27 466 A1 | 2/1996 |
| FR | 746984 | 6/1933 |
| FR | 1156341 | 5/1958 |
| GB | 2 296 037 | 6/1996 |
| JP | 57-92622 | 6/1982 |
| SU | 1275187 * | 12/1986 |
| SU | 1357032 | 12/1987 |
| WO | WO 85/03741 | 8/1985 |

* cited by examiner

FUEL PROCESSOR APPARATUS AND METHOD

BACKGROUND OF THE INVENTION

Many types of devices have been developed over the years for the purpose of converting liquids or aerosols into gas-phase fluids. Many such devices have been developed, for example, to prepare fuel for use in internal combustion engines. To optimize fuel oxidation within an engine's combustion chamber, the fuel/air mixture commonly must be further vaporized or homogenized to achieve a chemically-stoichiometric gas-phase mixture. Ideal fuel oxidation results in more complete combustion and lower pollution.

More specifically, relative to internal combustion engines, stoichiometricity is a condition where the amount of oxygen required to completely burn a given amount of fuel is supplied in a homogeneous mixture resulting in optimally correct combustion with no residues remaining from incomplete or inefficient oxidation. Ideally, the fuel should be completely vaporized, intermixed with air, and homogenized prior to entering the combustion chamber for proper oxidation. Non-vaporized fuel droplets generally do not ignite and combust completely in conventional internal and external combustion engines, which presents problems relating to fuel efficiency and pollution.

Incomplete or inefficient oxidation of fuel causes exhaustion of residues from the internal or external combustion engine as pollutants, such as unburned hydrocarbons, carbon monoxide, and aldehydes, with accompanying production of oxides of nitrogen. To meet emission standards, these residues must be dealt with, typically requiring further treatment in a catalytic converter or a scrubber. Such treatment of these residues results in additional fuel costs to operate the catalytic converter or scrubber. Accordingly, any reduction in residues resulting from incomplete combustion would be economically and environmentally beneficial.

Aside from the problems discussed above, a fuel-air mixture that is not completely vaporized and chemically stoichiometric causes the combustion engine to perform at less than peak efficiency. A smaller portion of the fuel's chemical energy is converted to mechanical energy when fuel is not completely combusted. Fuel energy is wasted and unnecessary pollution is created. Thus, by further breaking down and more completely vaporizing the fuel-air mixture, better fuel efficiency may be available.

Many attempts have been made to alleviate the above-described problems with respect to fuel vaporization and incomplete fuel combustion. In automobile engines, for example, direct fuel injection has almost universally replaced carburetion for fuel delivery. Fuel injectors spray a somewhat fine fuel mist directly into the cylinder of the engine and are controlled electronically. Currently, it is believed by most that the fuel injector spray allows the fuel and air to mix in the cylinders more efficiently than carburetion. Nevertheless, the fuel droplet size of a fuel injector spray is not optimal and there is little time for the fuel to mix with air prior to ignition. Even current fuel injector systems do not fully mix the fuel with the necessary air.

Moreover, it has been recently discovered that fuel injector sprays are accompanied by a shockwave in the fuel spray. The shockwave may prevent the fuel from fully mixing with air. The shockwave appears to limit fuel mass to certain areas of the piston, limiting the fuel droplets' access to air.

Other prior systems have also been developed in attempts to remedy the problems related to fuel vaporization and incomplete fuel combustion. For example, U.S. Pat. Nos. 4,515,734, 4,568,500, 5,512,216, 5,472,645, and U.S. Pat. No. 5,672,187 disclose various fuel vaporizing devices.

Nevertheless, prior vaporization devices fail to provide a configuration which is large enough to attain volumetric efficiencies at high RPM's, yet small enough to get high resolution responses at lower RPM's. Indeed, the prior devices have generally had to choose between volumetric efficiency at high RPM's and high resolution response at lower RPM's.

SUMMARY OF THE INVENTION

In an embodiment, there is provided a fuel nozzle, comprising a first end and a second end in opposition to one another, a line between the first end and the second end forming an axis, and the first end forming at least one port for receiving fuel therethrough; a sidewall extending between the first end and the second end, the sidewall forming a plurality of ports for introducing the fuel into a pre-combustion chamber, the plurality of ports arranged in a plurality of rows substantially parallel to one another and substantially perpendicular to the axis between the first end and the second end; and a plurality of conduits formed between the at least one port through the first end and the plurality of ports through the sidewall.

In another embodiment, there is provided a method, comprising fueling an internal combustion engine, the fueling comprising creating a gaseous, homogenous premixture of fuel and oxidizer in a first pre-combustion vortex chamber, comprising creating an oxidizer vortex in the first pre-combustion vortex chamber; introducing fuel at an axis of the oxidizer vortex both axially and radially through an injector having a plurality of ports through a sidewall arranged in a plurality of rows substantially parallel to one another; and pulverizing the fuel and mixing the fuel with the oxidizer at an axis area of the first pre-combustion vortex chamber; and drawing the gaseous, homogenous premixture of fuel and oxidizer from the first pre-combustion vortex chamber into a combustion chamber.

In yet another embodiment, there is provided an apparatus, comprising a pre-combustion fuel mixing device, the device comprising a housing; a first pre-combustion vortex chamber having a first compartment, a second compartment, and a third compartment enclosed by the housing; a plurality of angled passages leading into the first pre-combustion vortex chamber for creating a vortex; a first oxidant fluid flow path in fluid communication with the first pre-combustion vortex chamber; a second pre-combustion vortex chamber enclosed by the housing, the second pre-combustion vortex chamber being larger than the first pre-combustion vortex chamber; a plurality of angled passages leading into the second pre-combustion vortex chamber for creating a vortex; and a second oxidant fluid flow path in fluid communication with the second pre-combustion vortex chamber.

In still another embodiment, there is provided a method, comprising fueling an internal combustion engine, the fueling comprising creating a gaseous, homogenous premixture of fuel and oxidizer in a first pre-combustion vortex chamber having a first compartment, a second compartment, and a third compartment; and drawing the gaseous, homogenous premixture of fuel and oxidizer from the first pre-combustion vortex chamber into a combustion chamber.

In another embodiment, there is provided an apparatus, comprising a pre-combustion fuel mixing device, the device comprising a housing; a first pre-combustion vortex chamber having a first compartment, a second compartment, and a third compartment enclosed by the housing; a plurality of angled passages leading into the first pre-combustion vortex chamber for creating a vortex; a first oxidant fluid flow path in fluid communication with the first pre-combustion vortex chamber; a second pre-combustion vortex chamber enclosed by the housing, the second pre-combustion vortex chamber being larger than the first pre-combustion vortex chamber; a plurality of angled passages leading into the second pre-combustion vortex chamber for creating a vortex; and a second oxidant fluid flow path in fluid communication with the second pre-combustion vortex chamber.

In yet another embodiment, there is provided an apparatus, comprising an internal combustion engine premixing device, the device comprising a two stage vortex chamber, wherein a first stage is in fluid communication with a first oxidation source and defines a first compartment, a second compartment, and a third compartment, and a second stage is in fluid communication with a separate, second oxidation source; and a fuel injector having a first end and a second end, defining an axis from the first end to the second end, and having a plurality of radial flow channels defining plurality of ports arranged substantially parallel to one another and substantially perpendicular to the axis arranged axially internal of the first stage.

Other embodiments are also disclosed.

BRIEF DESCRIPTION OF THE DRAWINGS

The accompanying drawings illustrate certain embodiments discussed below and are a part of the specification.

Throughout the drawings, identical reference characters and descriptions indicate similar, but not necessarily identical elements.

DETAILED DESCRIPTION

Illustrative embodiments and aspects are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

As used throughout the specification and claims, the term "pre-combustion chamber" refers to an area that is not a combustion area. The words "including" and "having," as used in the specification, including the claims, have the same meaning as the word "comprising."

Figure 1:
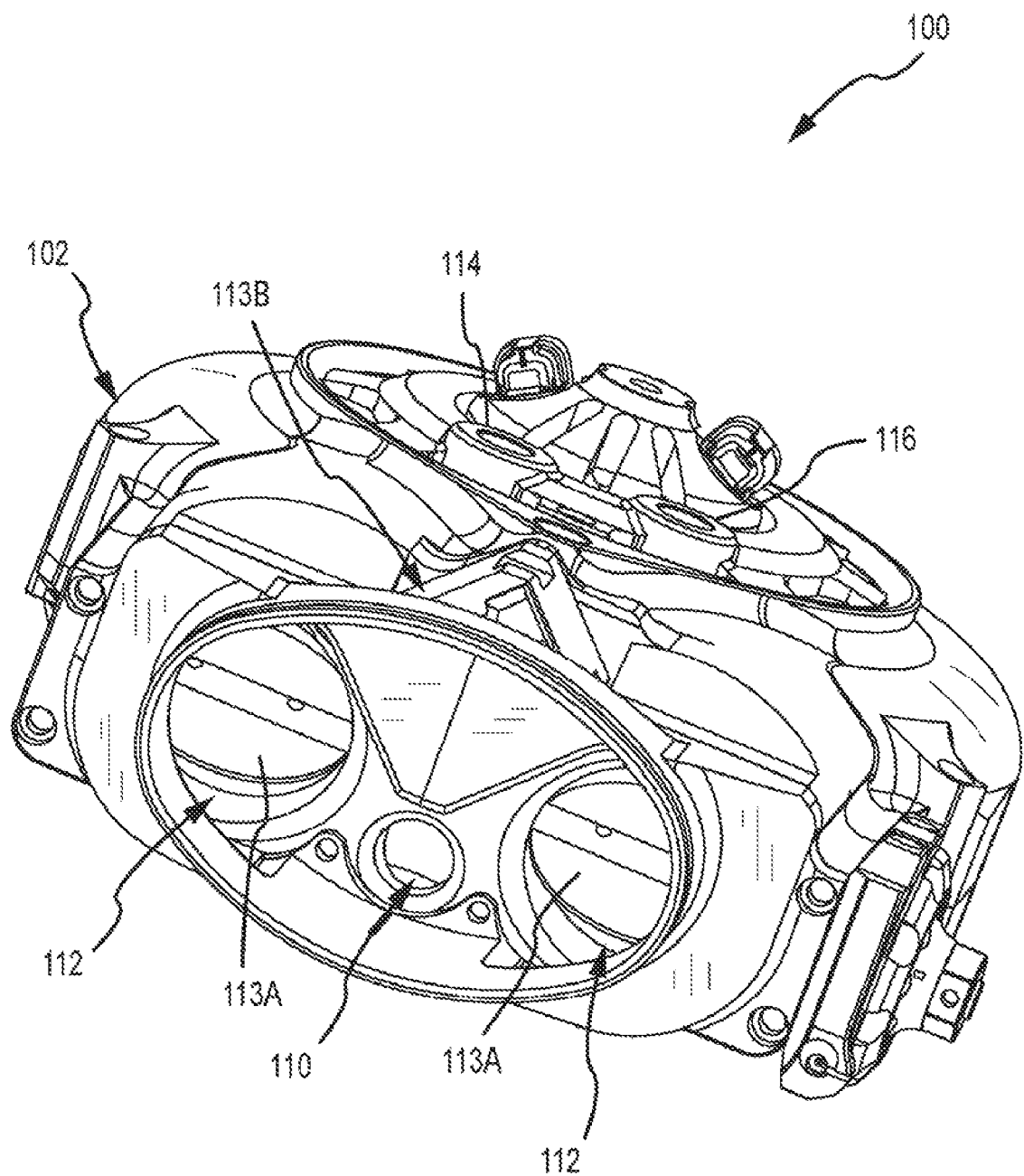
FIGS. 1 and 2 illustrate perspective views of a pre-combustion fuel mixing device.
Figure 2:
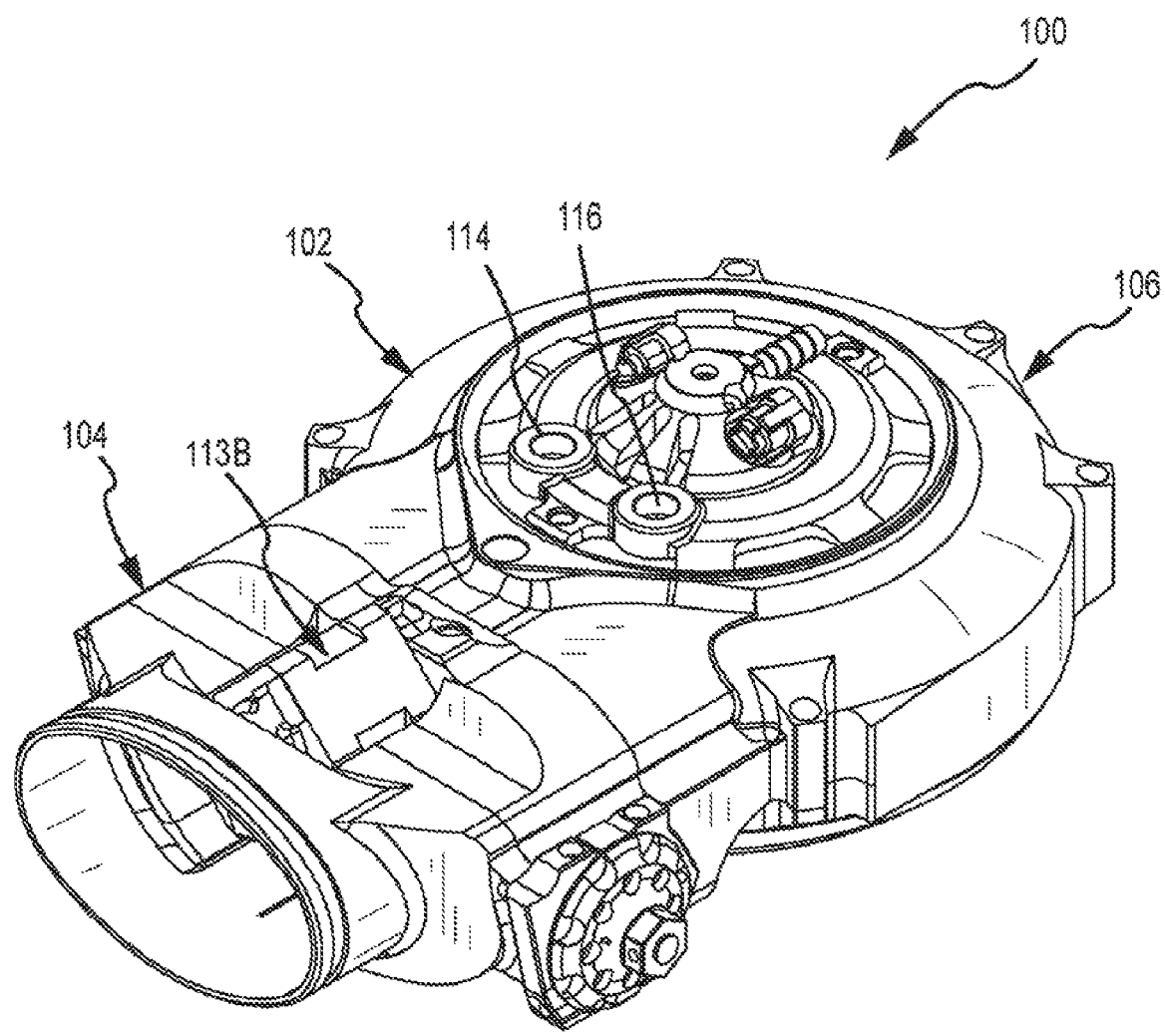
Figure 3:
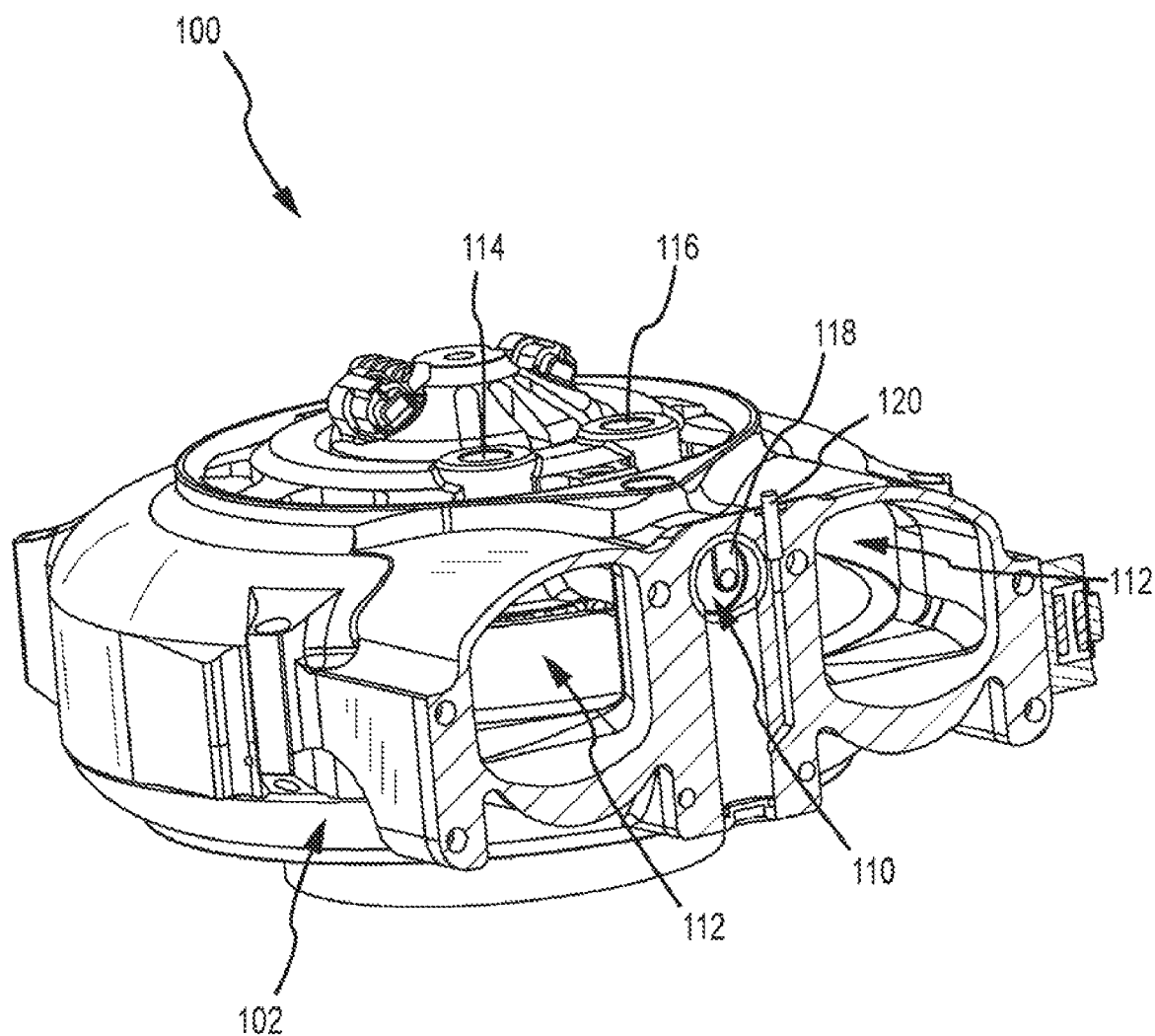
FIG. 3 illustrates a cross-sectional view of a portion of the pre-combustion fuel mixing device shown in FIGS. 1 and 2.

Turning now to the figures, and in particular to FIGS. 1-12, embodiments of a mixing apparatus and a fuel nozzle are shown. The mixing apparatus may comprise, for example, a pre-combustion fuel mixing device 100 (FIGS. 1-3). The pre-combustion fuel mixing device 100 may provide a premixed supply of fuel and oxidant to an internal combustion engine or other device. FIGS. 1 and 2 illustrate the pre-combustion fuel mixing device 100 fully assembled and FIG. 3 illustrates the pre-combustion fuel mixing device in cross-section.

The pre-combustion fuel mixing device 100 may include a housing 102. The housing 102 is a generally rigid structure that may be made of metal, ceramic, composite, plastic, or other materials. The housing 102 may encloses a number of internal components which are described below. The housing 102 may comprise any size or shape, although as shown in FIG. 2, some embodiments of the housing include an oxidant inlet section 104 and a vortex section 106. The oxidant inlet section 104 may comprise a throttle body.

Figure 4:
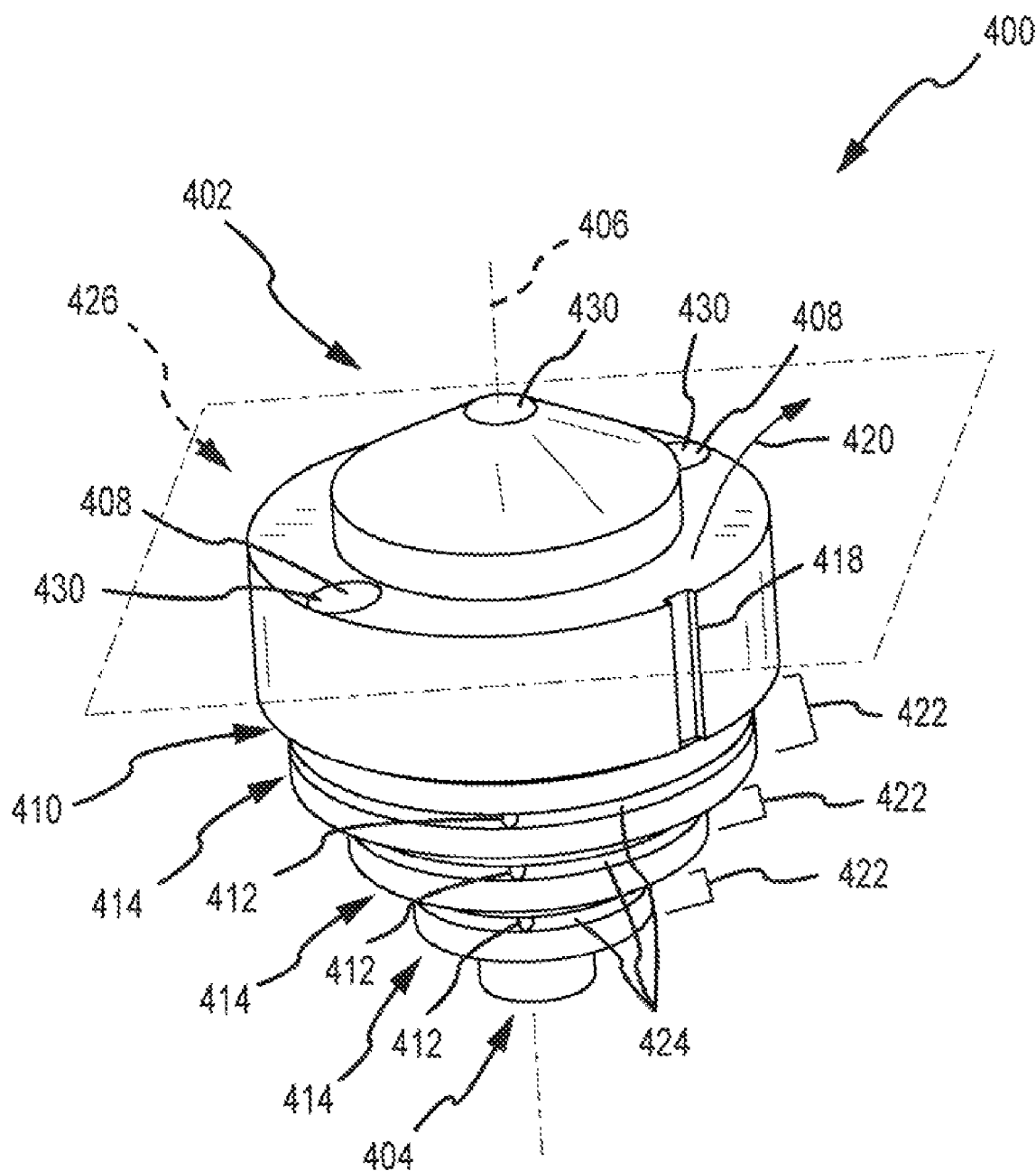
FIGS. 4-6 illustrate various views of a fuel nozzle.
Figure 5:
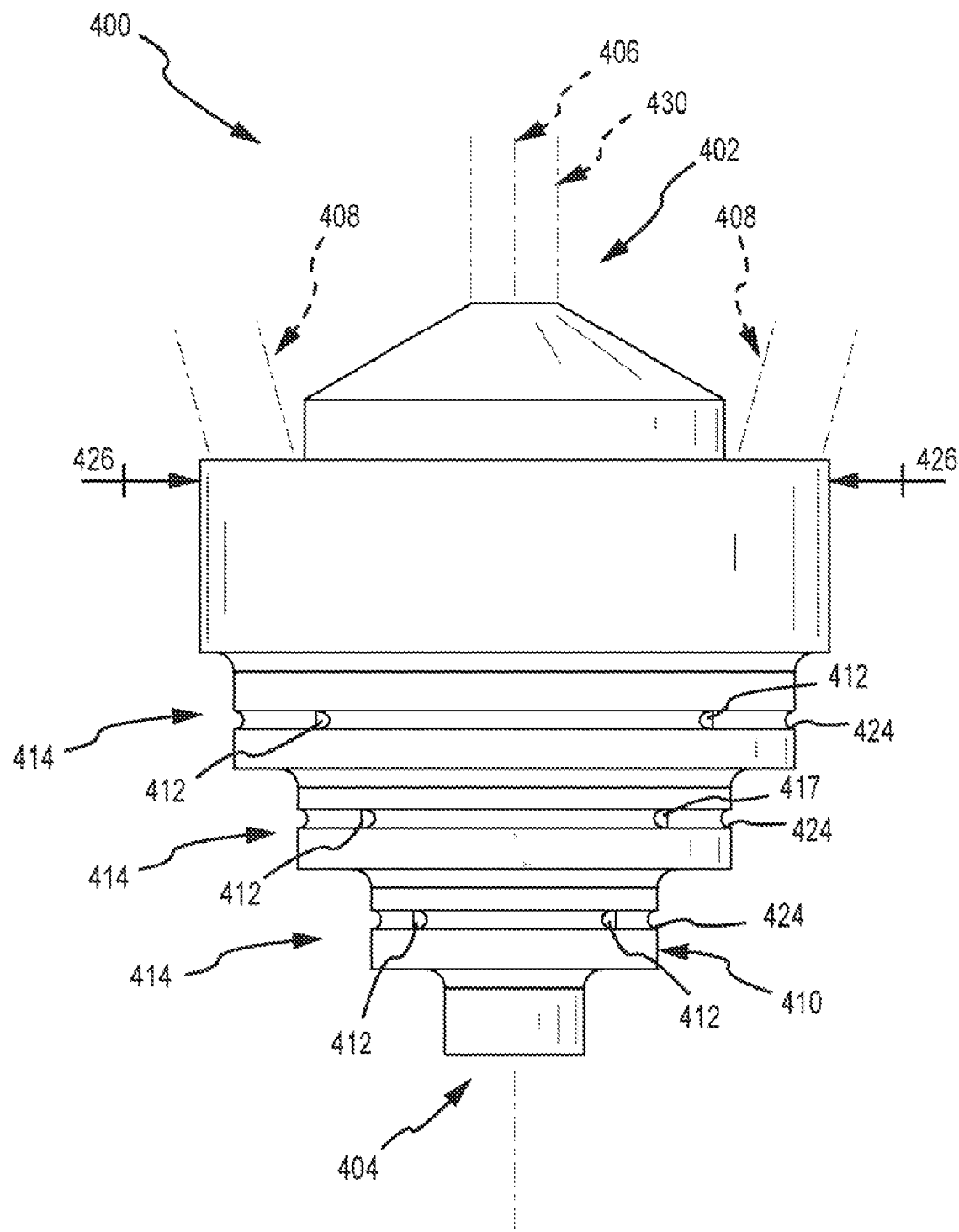
Figure 6:
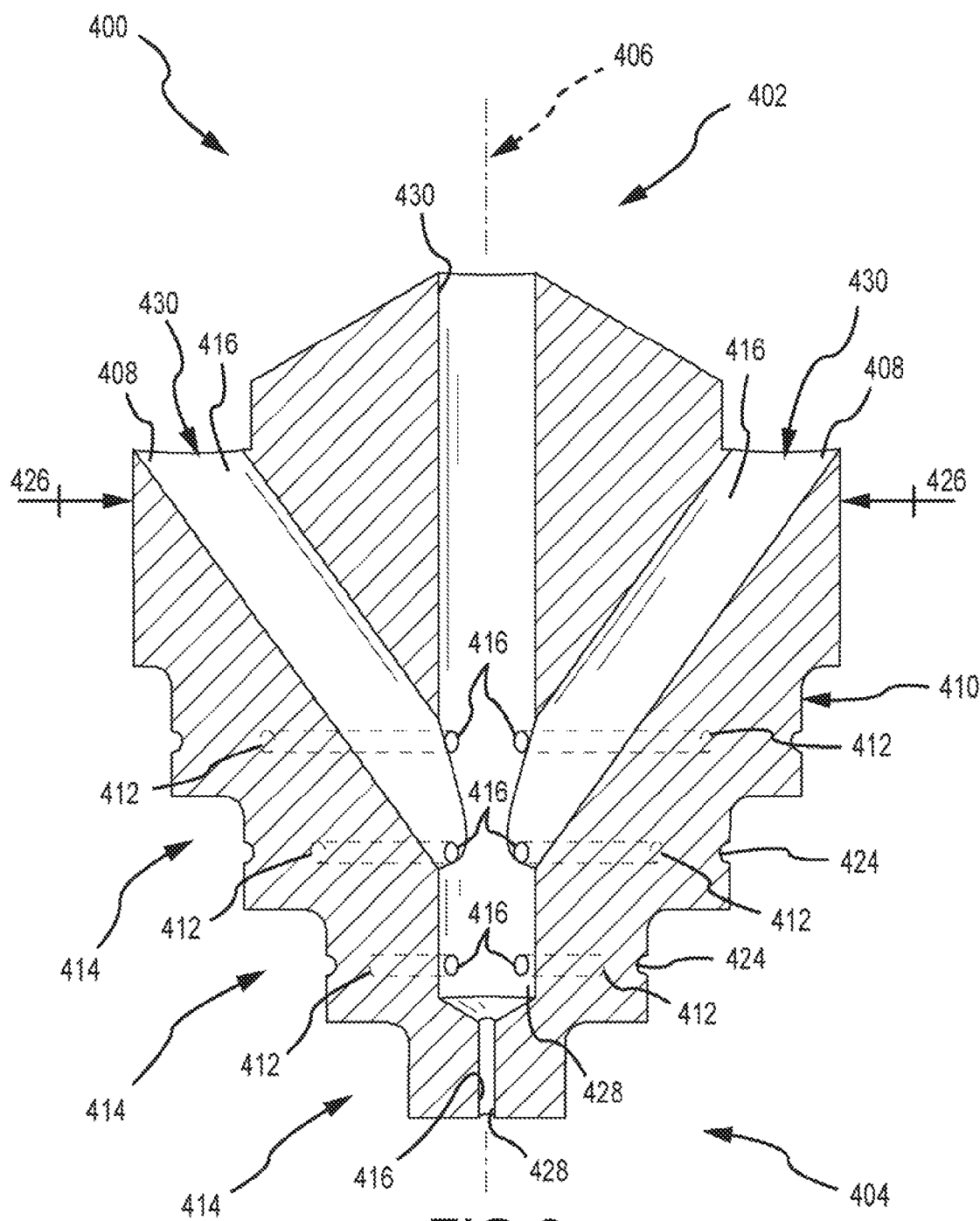

Referring now to FIGS. 4-6, and in an embodiment, there is shown a fuel nozzle 400. Generally, fuel nozzle 400 includes a first end 402 and a second end 404 in opposition to one another. A line between the first end 402 and the second end 404 form an axis 406. At least one port 408 for receiving fuel therethrough is formed on the first end 402.

Figure 7:
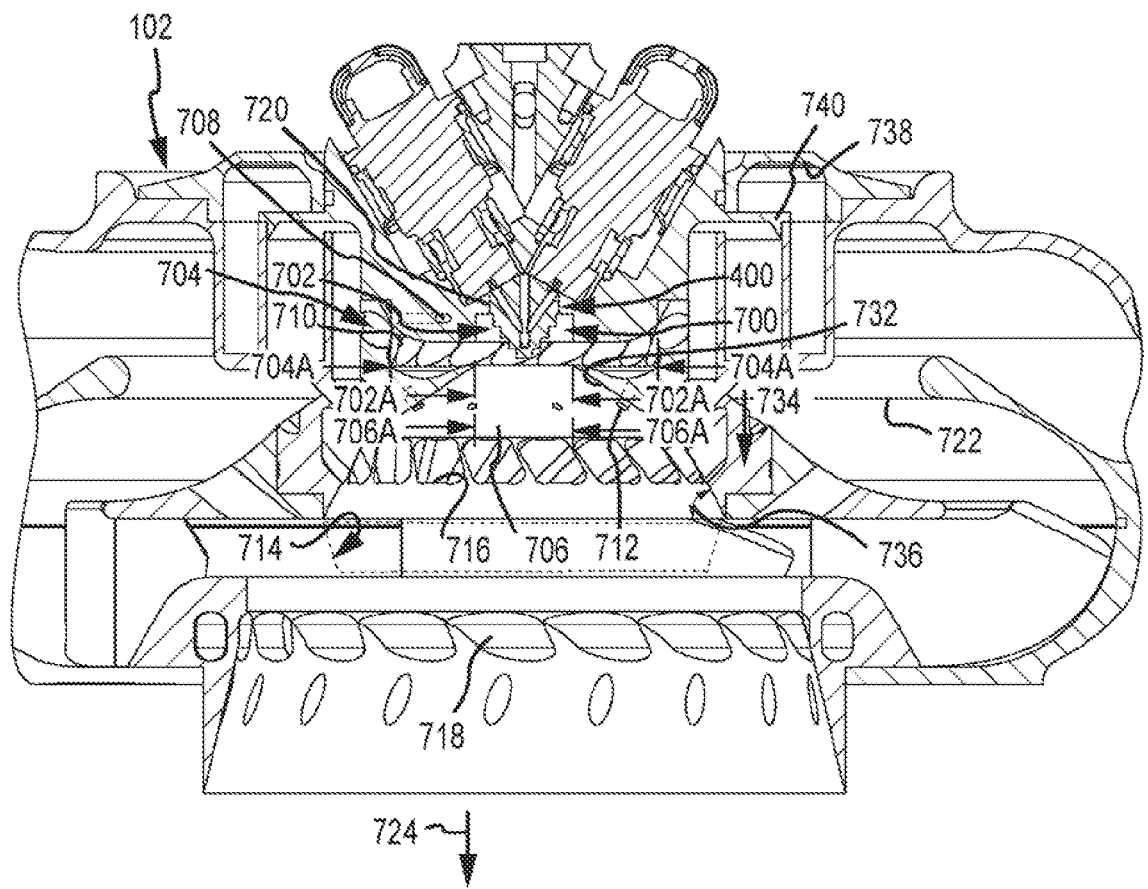
FIGS. 7 and 8 illustrate schematic views of a first stage and a second stage of the pre-combustion fuel mixing device shown in FIGS. 1 and 2.

A sidewall 410 extends between the first end 402 and the second end 404 of fuel nozzle 400. A plurality of ports 412 are provided for introducing the fuel into a pre-combustion chamber 700 (FIG. 7). Plurality of ports 412 may be arranged in a plurality of rows 414 substantially parallel to one another and substantially perpendicular to the axis 406 between the first end 402 and the second end 406. A plurality of conduits 416 may be formed between the one or more ports 408 through the first end 402 and the plurality of ports 412 through the sidewall 410.

In one embodiment, sidewall 410 may include a notch 418 adjacent the first end 402. Notch 418 may be configured to allow airflow 420 from the second end 404 to the first end 402 of fuel nozzle 400. This allows oxidant, such as air, to get from the front of fuel nozzle 400, e.g., adjacent second side 404, to the back of fuel nozzle 400, e.g., adjacent first side 402, so as to aid in fuel mixing.

The plurality of rows 414 may form a number of bands 422 in parallel to one another. As shown, three bands 422 are provided with decreasing outer diameters. A number of ports 412 may be provided in each of the rows 414 of the parallel bands 422. For example, four ports 412 extending through the sidewall 410. Parallel bands 422 may be configured such that fuel shoots down to a corner area and mixes into and with the flow of oxidant.

Each of the rows 414 may include a groove 424 extending through each of the ports 412 extending through the sidewall 410 within each of the parallel bands 422. Groove 424 may be configured to provide a more desired mixture of the fuel with the oxidant.

Generally, the sidewall 410 is substantially arcuate within a plane 426 formed substantially perpendicular to axis 406. However, the sidewall 410 may include discontinuities, such as one or more notches, or may include portions forming other shapes.

Still referring to FIGS. 4-6, the second end 404 of fuel nozzle may form a port 428 for introducing fuel into a pre-combustion chamber 700 (FIG. 7).

As shown in FIGS. 4-6, the plurality of ports 412 through the sidewall 410 may be disposed on fuel nozzle 400 so as to allow disposal of the second end 404 further into the pre-combustion chamber 700 (FIG. 7) than a fuel injector having a single row of ports through a sidewall.

In one embodiment, fuel nozzle 400 may be formed with two ports 430 at the first end 402. Each port 408 of the two ports 430 may be configured to receive a separate supply of fuel.

Methods for fueling an internal combustion engine are disclosed herein. In an embodiment, the fueling may include creating a gaseous, homogenous premixture of fuel and oxidizer in a first pre-combustion vortex chamber. Within the first pre-combustion vortex chamber, this may include creating an oxidizer vortex in the first pre-combustion vortex chamber. The first pre-combustion vortex chamber may also include introducing fuel at an axis of the oxidizer vortex both axially and radially through an injector having a plurality of ports through a sidewall arranged in a plurality of rows substantially parallel to one another. Creating the gaseous, homogeneous premixture may also include pulverizing the fuel and mixing the fuel with the oxidizer at an axis area of the first pre-combustion vortex chamber. Subsequently, the fueling may include drawing the gaseous, homogenous premixture of fuel and oxidizer from the first pre-combustion vortex chamber into a combustion chamber.

Figure 8:
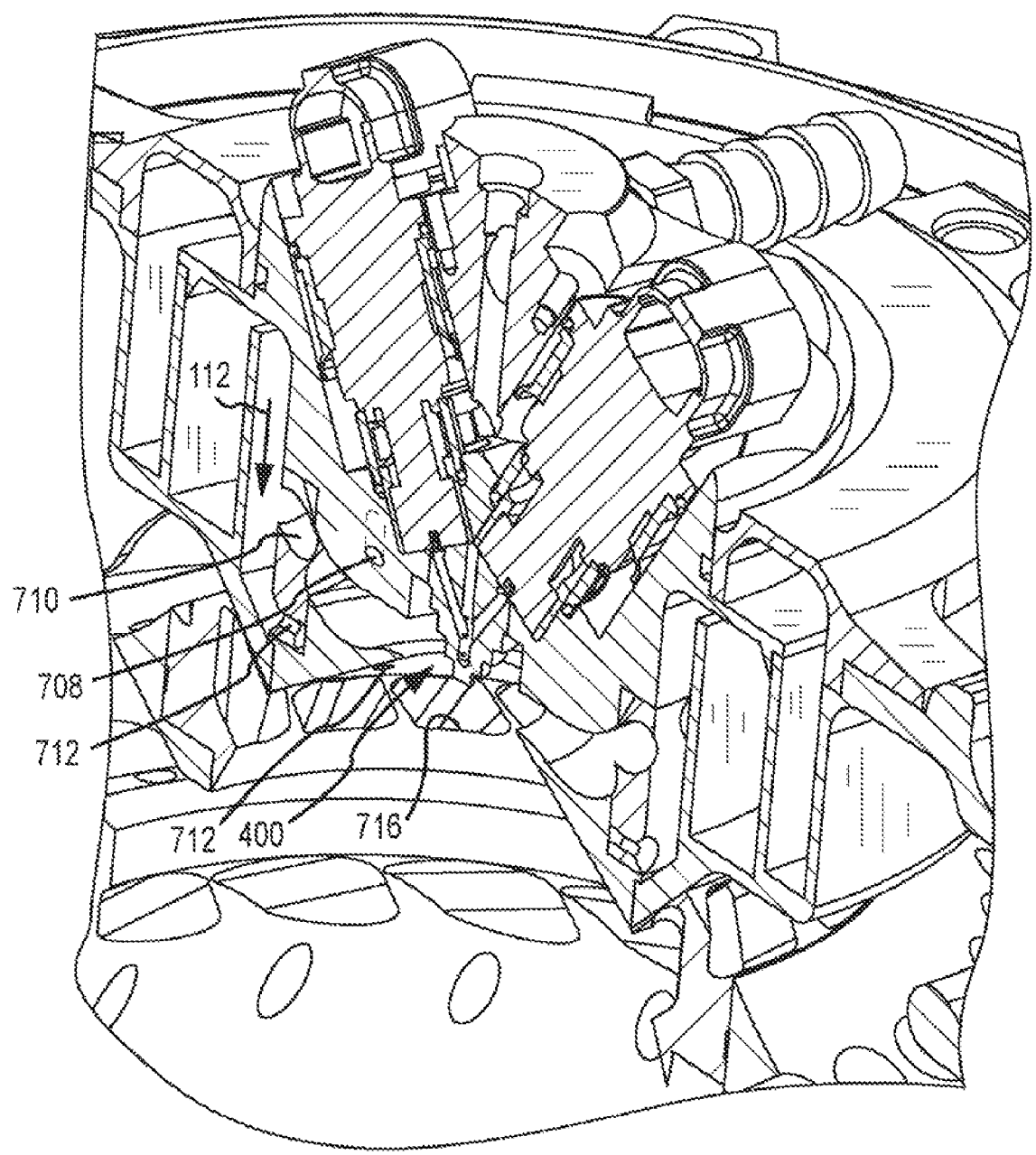

Looking at FIGS. 7 and 8, the housing 102 encloses first pre-combustion vortex chamber or first stage 700 having a first compartment 702, a second compartment 704, and a third compartment 706.

A plurality of angled passages 708, 710, 712 lead into the first pre-combustion vortex chamber 700. Passage 110 facilitates the creation of a vortex or tornado in the first pre-combustion vortex chamber 700. A first oxidant flow introduction path 110 disposed in the housing 102 is in fluid communication with the first pre-combustion vortex chamber 700. The first oxidant flow path 110 provides a primary air or oxidant source to the first pre-combustion vortex chamber 700. A valve 118 (FIG. 3) disposed in the first oxidant flow path 110 may comprise an electronically controlled valve to regulate the flow or flow rate of air into the first pre-combustion vortex chamber 700. This rate may be based on need. In an embodiment, an adjustment screw 120 may be provided for regulating first valve 118.

A second pre-combustion vortex chamber 714 is enclosed by the housing 102. In an embodiment, the second pre-combustion vortex chamber 714 is larger than the first pre-combustion vortex chamber 700. A plurality of angled passages 716, 718 lead into the second pre-combustion vortex chamber 714 for creating a vortex. As shown in FIGS. 1-3, a second oxidant fluid flow path 112 may be provided in fluid communication with the second pre-combustion vortex chamber 714. In one embodiment, a valve system may be provided in flow path 112. For example, a butterfly valve 113A may disposed in the second oxidant fluid flow path 112. A stepper motor 113B may actuate butterfly valve 113A. Generally, valve system operates and opens a predetermined amount based on oxidant need.

In an embodiment, fuel injector 400 may be aligned substantially axially with the first and second pre-combustion vortex chambers 700, 714. Fuel injector 400 may include an axial flow channel 416A/428, in addition to radial flow channels 412/416B.

Fuel injector 400 may be disposed in a cylindrical cavity 720 of the housing 102 and in fluid communication with the first and second pre-combustion vortex chambers 700, 714. A liquid flow channel 416 may be provided in fuel injector 400. In an embodiment, an atmospheric vent 430 may be provided in fluid communication with liquid flow channel 416.

Figure 9:
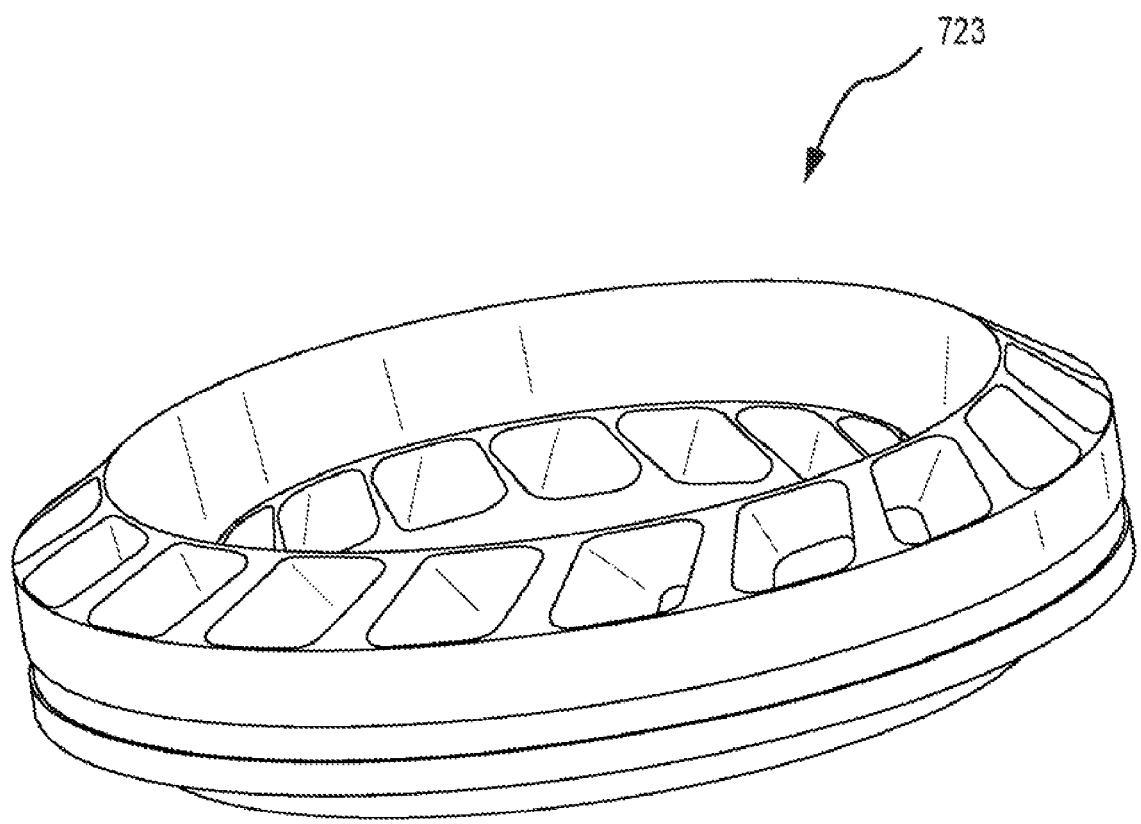
FIG. 9 illustrates an axle flow ring removed from the second stage as shown in FIGS. 7 and 8.
Figure 10:
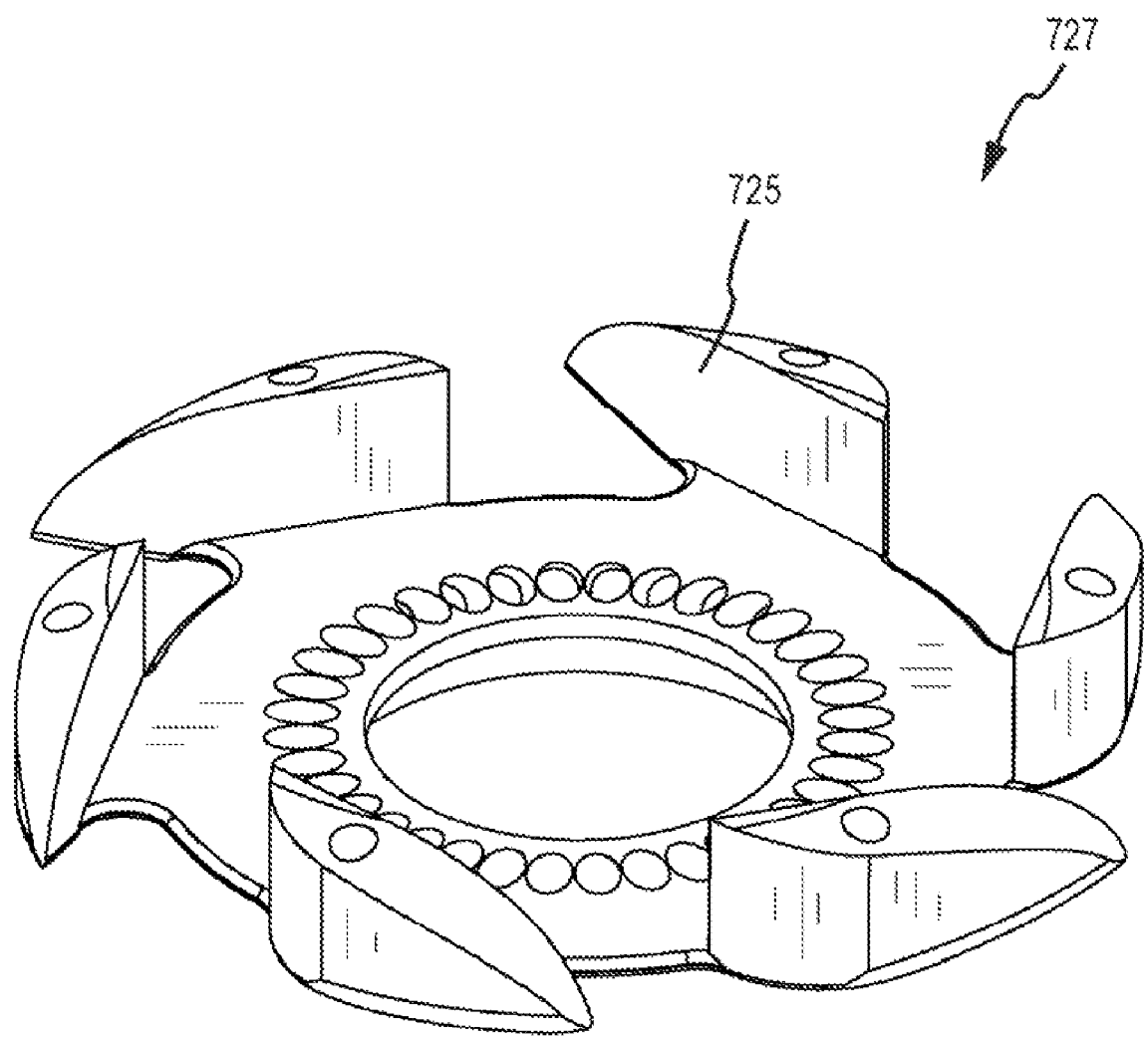
FIGS. 10 and 11 illustrate a second stage TPX wheel for holding the axle flow ring.
Figure 11:
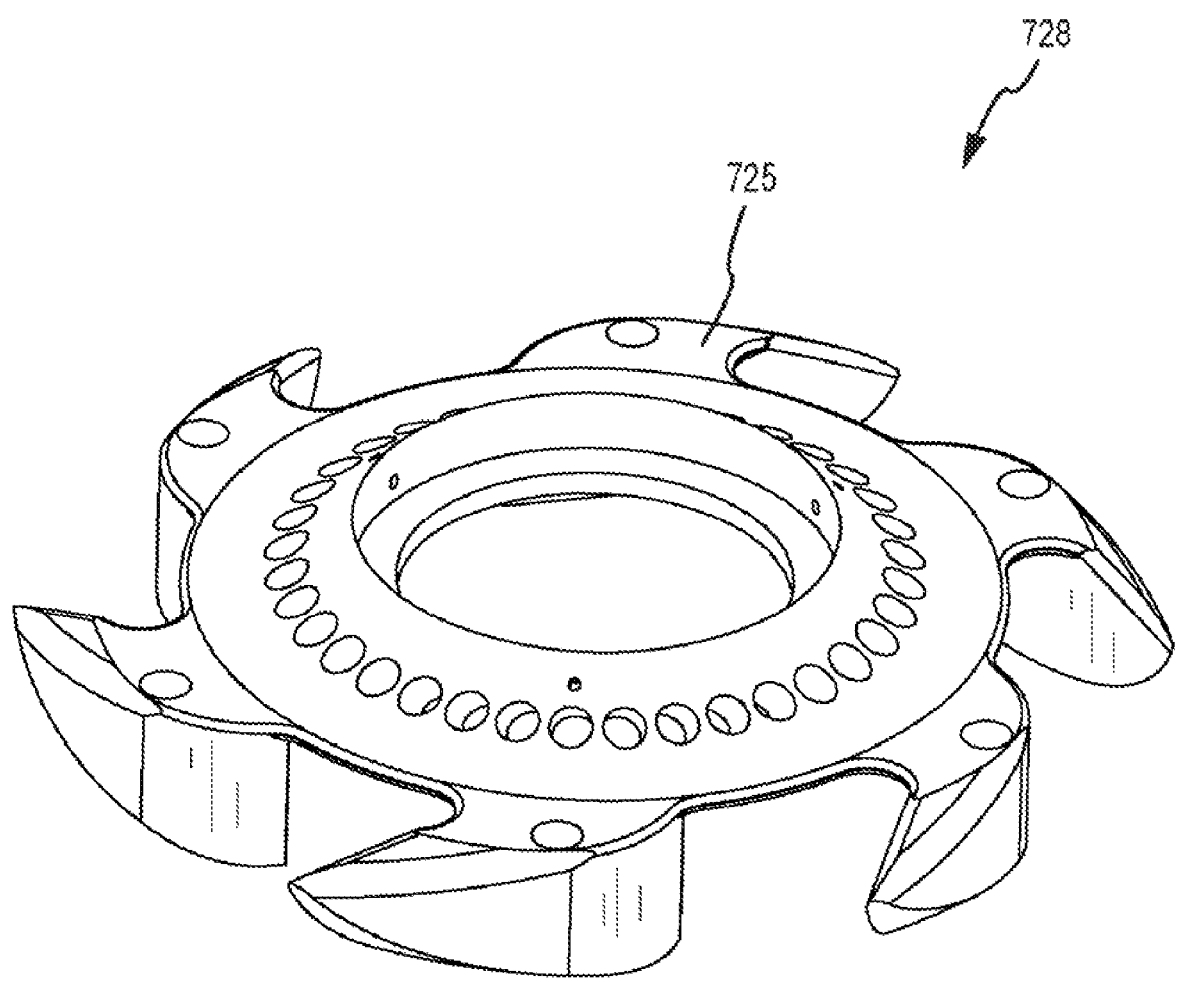

As illustrated in FIG. 7, the first compartment 702 of first pre-combustion vortex chamber 700 has a first width 702A. The second compartment 704 has a second width 704A. The third compartment 706 has a third width 706A. In one embodiment, the first width 702A is substantially similar to the third width 706A, while the second width 704A is larger than the first width 702A. Alternatively, the various compartments may be configured with other size relationships to one another. FIG. 9 illustrates an axle flow ring 723. FIGS. 10 and 11 show a wheel 725 (with sides 727, 728, respectively) for holding ring 723.

Figure 13:
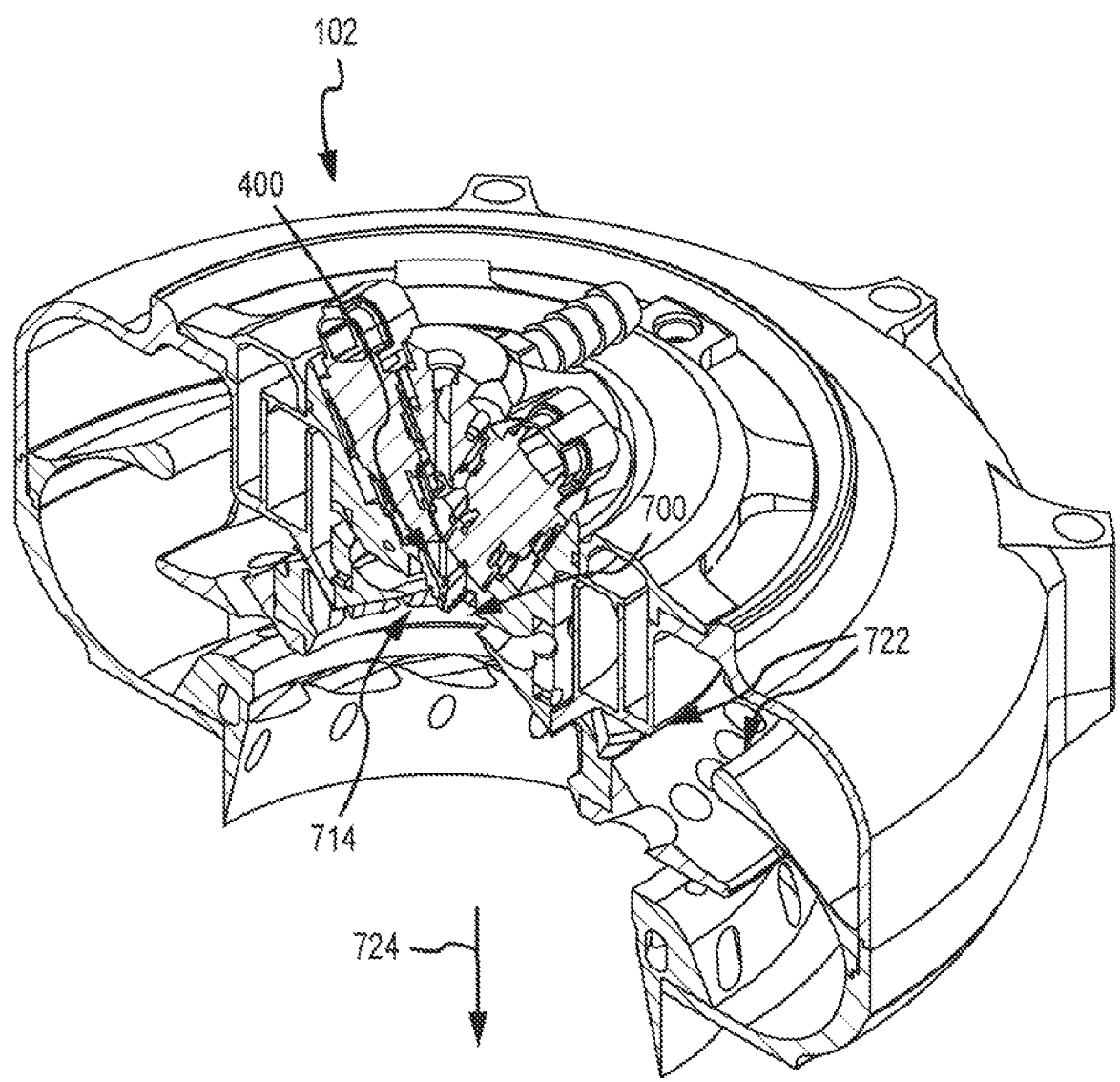
FIG. 13 illustrates a schematic view of a first stage and a second stage of the pre-combustion fuel mixing device shown in FIGS. 1, 2, 7, and 8.

As best illustrated in FIG. 13, an opening 722 may be configured to provide a concentric feed of airflow evenly and concentrically through, and to an exit in a direction 724, out of second pre-combustion chamber 714. In an embodiment, opening 722 may include a radiused edge with a flange so as to force airflow evenly and concentrically.

A wall 732 of the third compartment 706 may taper outwardly in a direction 734 away from the second compartment 704. In one embodiment, the wall 732 tapers at an angle 736 of about 120 degrees.

Methods for fueling an internal combustion engine are disclosed herein. In an embodiment, the fueling may include creating a gaseous, homogenous premixture of fuel and oxidizer in a first pre-combustion vortex chamber having a first compartment, a second compartment, and a third compartment. The fueling may also include drawing the gaseous, homogenous premixture of fuel and oxidizer from the first pre-combustion vortex chamber into a combustion chamber.

One method of creating a gaseous, homogenous premixture of fuel and oxidizer may include creating an oxidizer vortex in the first compartment and the second compartment of the first pre-combustion vortex chamber. This method may further include introducing fuel into the second compartment along an axis of the oxidizer vortex and into the first compartment in directions perpendicular to the axis. Creating the gaseous, homogenous premixture may also include pulverizing the fuel and mixing the fuel with the oxidizer at radial areas in the first compartment and in the second compartment, and axial areas in the second compartment and third compartment of the first pre-combustion vortex chamber.

In another embodiment, creating a gaseous, homogenous premixture of fuel and oxidizer may include creating an oxidizer vortex in the first compartment and the second compartment of the first pre-combustion vortex chamber. This method may include introducing fuel into the second compartment along an axis of the oxidizer vortex and into the first compartment along directions perpendicular to the axis. Creating a gaseous, homogenous premixture of fuel and oxidizer may also include pulverizing the fuel and mixing the fuel with the oxidizer at radial areas in the first compartment and in the second compartment, and axial areas in the second compartment and the third compartment of the first pre-combustion vortex chamber. Creating an oxidizer vortex may include introducing the oxidizer into the first pre-combustion vortex chamber at a non-tangential, non-radial angle through multiple fluid passageways. The passageways may define a plurality of ports arranged in a plurality of rows substantially parallel to one another and substantially perpendicular to the axis of the oxidizer vortex.

In another embodiment, creating a gaseous, homogenous premixture of fuel and oxidizer may include providing a primary stage oxidizer introduction path. The method may also include providing a secondary stage oxidizer introduction path. Creating a gaseous, homogenous premixture of fuel and oxidizer may include opening a valve in the secondary stage oxidizer introduction path upon reaching a predetermined oxidizer requirement threshold. This may be followed by creating an oxidizer vortex in a second pre-combustion vortex chamber with fluid flow from the secondary stage oxidizer introduction path. Next, the method may include introducing fuel at an axis of the oxidizer vortex. The method may also include pulverizing the fuel and mixing the fuel with the oxidizer.

Creating a gaseous, homogenous premixture of fuel and oxidizer may include providing a primary stage oxidizer introduction path, and providing a secondary stage oxidizer introduction path. The method may include opening a valve in the secondary stage oxidizer introduction path upon reaching a predetermined oxidizer requirement threshold and holding open a valve in the primary stage oxidizer introduction path. This may be followed by creating an oxidizer vortex in a second pre-combustion vortex chamber with fluid flow from the secondary stage oxidizer introduction path. Next, the method may include introducing fuel at an axis of the oxidizer vortex. The method may also include pulverizing the fuel and mixing the fuel with the oxidizer.

In another exemplary embodiment, the method may include creating an oxidizer vortex in the first pre-combustion vortex chamber. Creating a gaseous, homogenous premixture of fuel and oxidizer may include introducing fuel at an axis of the oxidizer vortex both axially into the second compartment and radially into the first compartment through an injector. Optionally, the method may include pulverizing the fuel and mixing the fuel with the oxidizer at radial areas in the first compartment and the second compartment, and axial areas in the second compartment and the third compartment of the first pre-combustion vortex chamber.

In another embodiment, creating a gaseous, homogenous premixture of fuel and oxidizer may include providing a primary stage oxidizer introduction path, and providing a secondary stage oxidizer introduction path. The method may also include mechanically opening a throttle valve in the second stage oxidizer introduction path according to fuel pedal position. The method may further include creating an oxidizer vortex in a second pre-combustion vortex chamber with fluid flow from the secondary stage oxidizer introduction path. This may be followed by introducing fuel at an axis of the oxidizer vortex. Optionally, the method may include pulverizing the fuel and mixing the fuel with the oxidizer.

The method may further include warming airflow through the primary stage oxidizer introduction path with coolant disposed in a coolant chamber. The primary stage oxidizer introduction path and the coolant chamber sharing a common wall having an arcuate shape. In an embodiment, the method may include cycling the coolant from an engine cooling system through an inlet of the coolant chamber. Simultaneously, the method may also include returning the coolant to the engine cooling system through an outlet of the cooling chamber.

In an exemplary embodiment, the first stage 700 may include a high vacuum, low flow rate vortex chamber. The second stage 714 may include a larger volume than the first stage and comprises a low vacuum, high flow rate vortex chamber.

In one embodiment, the first oxidation source 110 is open to the first stage 700 until a predetermined flow rate is reached. Subsequently, the second oxidation source 112 is opened when the predetermined flow rate is reached.

Figure 12:
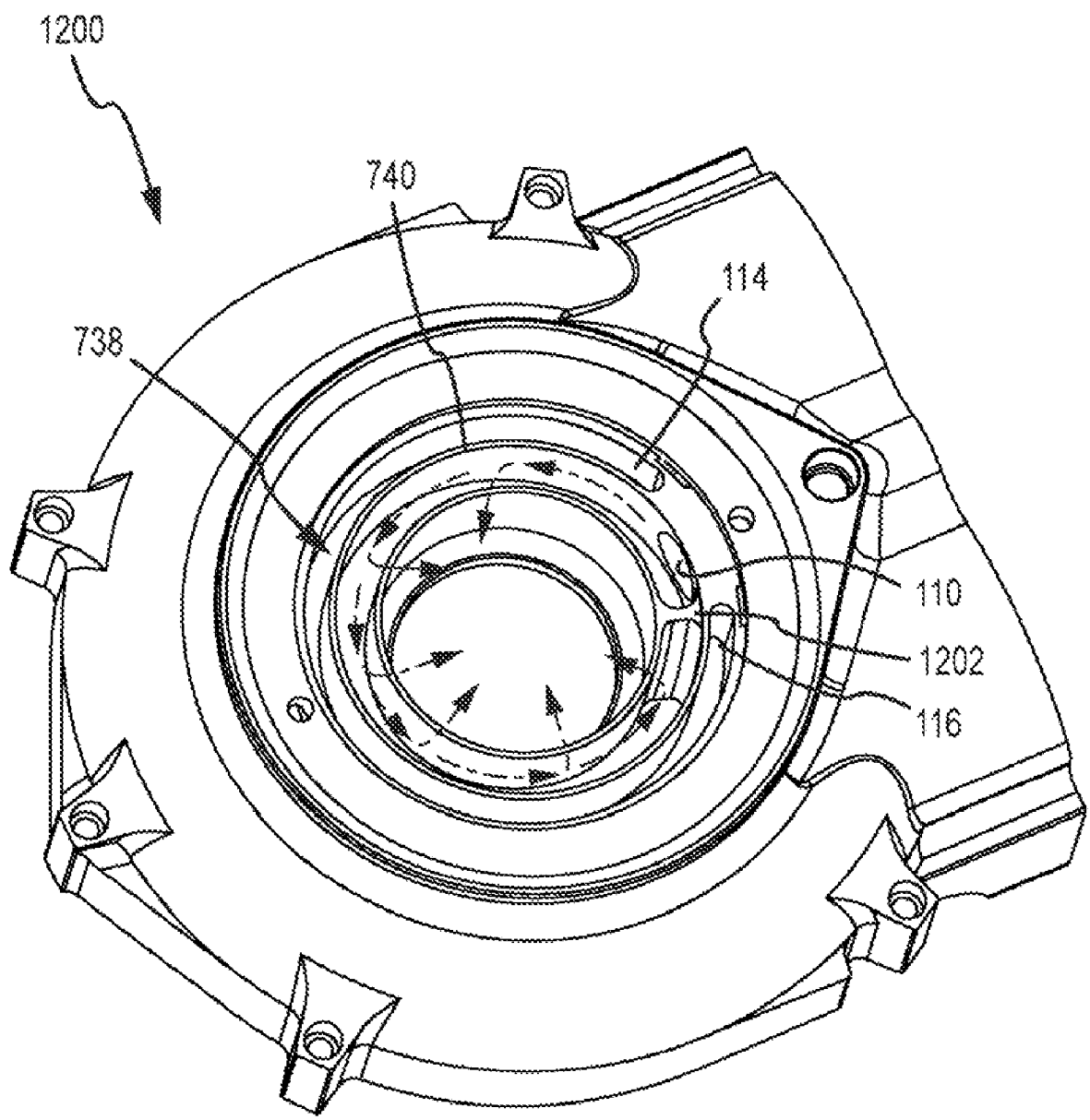
FIG. 12 illustrates a schematic view of a coolant chamber disposed in a portion of the pre-combustion fuel mixing device.

Looking at FIGS. 7 and 12, there may be provided a water jacket 738 disposed about the first stage 700 of the two stage vortex chamber 700, 714. Water jacket 738, which may be referred to as a coolant chamber 738, may be configured for warming airflow through the primary stage oxidizer introduction path 110. A common wall 740 of the coolant chamber 738 and the primary stage oxidizer introduction path 110 may be provided in an arcuate shape.

An inlet 114 may be provided for receiving the coolant from an engine cooling system into the coolant chamber 738. Similar to the inlet 114, an outlet 116 may be provided for returning the coolant to the engine cooling system from the coolant chamber 738. In an embodiment, the coolant of water jacket 738 primarily cools the engine and operates in steady state conditions at approximately 87-100° C. (190-212° F.).

The preceding description has been presented only to illustrate and describe certain aspects, embodiments, and examples of the principles claimed below. It is not intended to be exhaustive or to limit the described principles to any precise form disclosed. Many modifications and variations are possible in light of the above teaching. Such modifications are contemplated by the inventor and within the scope of the claims. The scope of the principles described is defined by the following claims.

What is claimed is:

1. A method, comprising:
fueling an internal combustion engine, the fueling comprising:
creating a gaseous, homogenous premixture of fuel and oxidizer in a first pre-combustion vortex chamber, comprising:
creating an oxidizer vortex in the first pre-combustion vortex chamber;
introducing fuel at an axis of the oxidizer vortex both axially and radially through an injector having a plurality of ports through a sidewall arranged in a plurality of rows substantially parallel to one another; and
pulverizing the fuel and mixing the fuel with the oxidizer at an axis area of the first pre-combustion vortex chamber; and
drawing the gaseous, homogenous premixture of fuel and oxidizer from the first pre-combustion vortex chamber into a combustion chamber.

2. A method, comprising:
fueling an internal combustion engine, the fueling comprising:
creating a gaseous, homogenous premixture of fuel and oxidizer in a first pre-combustion vortex chamber having a first compartment, a second compartment, and a third compartment; and
drawing the gaseous, homogenous premixture of fuel and oxidizer from the first pre-combustion vortex chamber into a combustion chamber.

3. A method according to claim 2 wherein the creating a gaseous, homogenous premixture of fuel and oxidizer comprises:
creating an oxidizer vortex in the first compartment and the second compartment of the first pre-combustion vortex chamber;
introducing fuel into the second compartment along an axis of the oxidizer vortex and into the first compartment in directions perpendicular to the axis; and
pulverizing the fuel and mixing the fuel with the oxidizer at radial areas in the first compartment and in the second compartment, and axial areas in the second compartment and third compartment of the first pre-combustion vortex chamber.

4. A method according to claim 2 wherein the creating a gaseous, homogenous premixture of fuel and oxidizer comprises:

creating an oxidizer vortex in the first compartment and the second compartment of the first pre-combustion vortex chamber;

introducing fuel into the second compartment along an axis of the oxidizer vortex and into the first compartment along directions perpendicular to the axis; and pulverizing the fuel and mixing the fuel with the oxidizer at radial areas in the first compartment and in the second compartment, and axial areas in the second compartment and the third compartment of the first pre-combustion vortex chamber; and wherein the creating an oxidizer vortex comprises introducing the oxidizer into the first pre-combustion vortex chamber at a non-tangential, non-radial angle relative to the axis of the oxidizer vortex through multiple fluid passageways, and wherein the passageways define a plurality of ports arranged in a plurality of rows substantially parallel to one another and substantially perpendicular to the axis of the oxidizer vortex.

5. A method according to claim 2 wherein the creating a gaseous, homogenous premixture of fuel and oxidizer comprises:

providing a primary stage oxidizer introduction path;
providing a secondary stage oxidizer introduction path;
opening a valve in the secondary stage oxidizer introduction path upon reaching a predetermined oxidizer requirement threshold;
creating an oxidizer vortex in a second pre-combustion vortex chamber with fluid flow from the secondary stage oxidizer introduction path;
introducing fuel at an axis of the oxidizer vortex;
pulverizing the fuel and mixing the fuel with the oxidizer.

6. A method according to claim 2 wherein the creating a gaseous, homogenous premixture of fuel and oxidizer comprises:

providing a primary stage oxidizer introduction path;
providing a secondary stage oxidizer introduction path;
opening a valve in the secondary stage oxidizer introduction path upon reaching a predetermined oxidizer requirement threshold and holding open a valve in the primary stage oxidizer introduction path;
creating an oxidizer vortex in a second pre-combustion vortex chamber with fluid flow from the secondary stage oxidizer introduction path;
introducing fuel at an axis of the oxidizer vortex; and
pulverizing the fuel and mixing the fuel with the oxidizer.

7. A method according to claim 2 wherein the creating a gaseous, homogenous premixture of fuel and oxidizer comprises:

creating an oxidizer vortex in the first pre-combustion vortex chamber;
introducing fuel at an axis of the oxidizer vortex both axially into the second compartment and radially into the first compartment through an injector; and
pulverizing the fuel and mixing the fuel with the oxidizer at radial areas in the first compartment and the second compartment, and axial areas in the second compartment and the third compartment of the first pre-combustion vortex chamber.

8. A method according to claim 2 wherein the creating a gaseous, homogenous premixture of fuel and oxidizer comprises:

providing a primary stage oxidizer introduction path;
providing a secondary stage oxidizer introduction path;
mechanically opening a throttle valve in the second stage oxidizer introduction path according to fuel pedal position;
creating an oxidizer vortex in a second pre-combustion vortex chamber with fluid flow from the secondary stage oxidizer introduction path;
introducing fuel at an axis of the oxidizer vortex; and
pulverizing the fuel and mixing the fuel with the oxidizer.

9. A method according to claim 8, further comprising warming airflow through the primary stage oxidizer introduction path with coolant disposed in a coolant chamber, the primary stage oxidizer introduction path and the coolant chamber sharing a common wall having an arcuate shape.

10. A method according to claim 9, further comprising cycling the coolant from an engine cooling system through an inlet of the coolant chamber, and returning the coolant to the engine cooling system through an outlet of the cooling chamber.

11. A method according to claim 2, further comprising warming the gaseous, homogenous premixture of fuel and oxidizer with a water jacket.

12. A method according to claim 9, further comprising cycling the coolant from an engine cooling system through an inlet of the coolant chamber, and returning the coolant to the engine cooling system through an outlet of the cooling chamber.

13. A method, comprising:

fueling an internal combustion engine, the fueling comprising:

creating a gaseous, homogenous premixture of fuel and oxidizer in a first pre-combustion vortex chamber having a first compartment, a second compartment, and a third compartment, the creating a gaseous, homogenous premixture of fuel and oxidizer comprises:

providing a primary stage oxidizer introduction path;
providing a secondary stage oxidizer introduction path;
opening a valve in the secondary stage oxidizer introduction path upon reaching a predetermined oxidizer requirement threshold;
creating an oxidizer vortex in a second pre-combustion vortex chamber with fluid flow from the secondary stage oxidizer introduction path;
introducing fuel at an axis of the oxidizer vortex;
pulverizing the fuel and mixing the fuel with the oxidizer; and drawing the gaseous, homogenous premixture of fuel and oxidizer from the first pre-combustion vortex chamber into a combustion chamber.

14. A method, comprising:

fueling an internal combustion engine, the fueling comprising:

creating a gaseous, homogenous premixture of fuel and oxidizer in a first pre-combustion vortex chamber having a first compartment, a second compartment, and a third compartment, the creating a gaseous, homogenous premixture of fuel and oxidizer comprises:

providing a primary stage oxidizer introduction path;
providing a secondary stage oxidizer introduction path;
opening a valve in the secondary stage oxidizer introduction path upon reaching a predetermined oxidizer requirement threshold and holding open a valve in the primary stage oxidizer introduction path;
creating an oxidizer vortex in a second pre-combustion vortex chamber with fluid flow from the secondary stage oxidizer introduction path;
introducing fuel at an axis of the oxidizer vortex; and
pulverizing the fuel and mixing the fuel with the oxidizer; and drawing the gaseous, homogenous premixture of fuel and oxidizer from the first pre-combustion vortex chamber into a combustion chamber.

15. A method, comprising:

fueling an internal combustion engine, the fueling comprising:

creating a gaseous, homogenous premixture of fuel and oxidizer in a first pre-combustion vortex chamber having a first compartment, a second compartment, and a third compartment, the creating a gaseous, homogenous premixture of fuel and oxidizer comprises:

providing a primary stage oxidizer introduction path;

providing a secondary stage oxidizer introduction path;

mechanically opening a throttle valve in the second stage oxidizer introduction path according to fuel pedal position;

creating an oxidizer vortex in a second pre-combustion vortex chamber with fluid flow from the secondary stage oxidizer introduction path;

introducing fuel at an axis of the oxidizer vortex; and pulverizing the fuel and mixing the fuel with the oxidizer; and drawing the gaseous, homogenous premixture of fuel and oxidizer from the first pre-combustion vortex chamber into a combustion chamber.

16. A method according to claim 15, further comprising warming airflow through the primary stage oxidizer introduction path with coolant disposed in a coolant chamber, the primary stage oxidizer introduction path and the coolant chamber sharing a common wall having an arcuate shape.

\* \* \* \* \*